US008663422B2

(12) United States Patent
Cropper

(10) Patent No.: US 8,663,422 B2
(45) Date of Patent: Mar. 4, 2014

(54) USE OF CERAMIC FIBER FIRE BARRIERS IN VEHICULAR COMPARTMENTS

(76) Inventor: Graig Cropper, Orem, UT (US)

( * ) Notice: Subject to any disclaimer, the term of this patent is extended or adjusted under 35 U.S.C. 154(b) by 0 days.

(21) Appl. No.: 13/300,806

(22) Filed: Nov. 21, 2011

(65) Prior Publication Data

US 2013/0015680 A1 Jan. 17, 2013

Related U.S. Application Data

(63) Continuation of application No. 12/556,474, filed on Sep. 9, 2009, now Pat. No. 8,062,464.

(60) Provisional application No. 61/095,589, filed on Sep. 9, 2008.

(51) Int. Cl.
*C09J 5/02* (2006.01)

(52) U.S. Cl.
USPC .................. 156/307.3; 428/921; 112/440

(58) Field of Classification Search
USPC ............. 428/290, 921, 80, 35, 193, 233, 251, 428/252; 264/31, 236; 156/307.3, 93; 112/440, 441
See application file for complete search history.

(56) References Cited

U.S. PATENT DOCUMENTS

| | | | |
|---|---|---|---|
| 3,253,978 A | 5/1966 | Bodendorf et al. | |
| 4,299,872 A * | 11/1981 | Miguel et al. | 428/117 |
| 4,522,673 A | 6/1985 | Fell et al. | |
| 4,650,621 A | 3/1987 | Sago et al. | |
| 4,926,963 A | 5/1990 | Snyder | |
| 5,273,821 A | 12/1993 | Olson et al. | |
| 5,624,726 A * | 4/1997 | Sanocki et al. | 428/74 |
| 5,679,433 A | 10/1997 | Hayashi et al. | |
| 5,759,659 A | 6/1998 | Sanocki et al. | |
| 5,945,049 A | 8/1999 | Vandermeer | |
| 5,955,177 A | 9/1999 | Sanocki et al. | |
| 6,112,488 A * | 9/2000 | Olson et al. | 52/393 |
| 6,147,015 A * | 11/2000 | Bureau | 442/29 |
| 6,153,674 A | 11/2000 | Landin | |
| 6,521,834 B1 | 2/2003 | Dykhoff et al. | |
| 6,533,897 B2 | 3/2003 | Wang et al. | |
| 6,551,951 B1 | 4/2003 | Fay et al. | |
| 7,878,301 B2 * | 2/2011 | Gross et al. | 181/290 |
| 7,883,056 B2 * | 2/2011 | Mueller et al. | 244/119 |
| 8,062,464 B2 | 11/2011 | Cropper | |
| 2007/0018042 A1 * | 1/2007 | Muller et al. | 244/117 R |

OTHER PUBLICATIONS

O.A. Battista, Synthetic Fibers in Papermaking, ca. Aug. 26, 1976.

* cited by examiner

*Primary Examiner* — Lori Lyjak
(74) *Attorney, Agent, or Firm* — Pate Peterson PLLC; Brett Peterson

(57) ABSTRACT

A ceramic fiber based fire barrier for vehicles contains and directs fires and prevents or substantially hinders fire or extreme heat from adversely affecting underlying materials. The fire barriers protect the vehicle and vehicle components from damage from fire and heat, and also provide increased protection to passengers. The fire barriers provide additional time to properly evacuate passengers from a vehicle in the case of an emergency.

19 Claims, 3 Drawing Sheets

USE OF CERAMIC FIBER FIRE BARRIERS IN VEHICULAR COMPARTMENTS

PRIORITY

The present application is a continuation application of U.S. patent application Ser. No. 12/556,474, filed Sep. 9, 2009 now U.S. Pat. No. 8,062,464, which is expressly incorporated herein and which claims the benefit of U.S. Provisional Application Ser. No. 61/095,589, filed Sep. 9, 2008, which is herein incorporated by reference in its entirety.

THE FIELD OF THE INVENTION

The present invention relates to providing fire protection to vehicular compartments. More specifically, the present invention relates to the use of ceramic fiber based materials such as ceramic paper to provide fire protection in vehicular compartments.

BACKGROUND

Vehicles are currently provided with some level of heat and noise insulation. Typically, automotive insulation consists of pads made of spun bonded synthetic plastic or plant fibers. These are primarily used to control noise and heat in the passenger compartment, making the ride more comfortable and reducing the energy required for heating and cooling.

There is, however, a need for improved fire protection for vehicles. The insulating materials commonly used in vehicles often do little to prevent fire from damaging the vehicle and threatening the occupants of the vehicle. Additionally, many of the materials used for vehicle insulation, carpeting, and upholstery will burn and will emit toxic chemicals if exposed to fire or high heat, compounding the danger for the occupants of the vehicle.

There are several reasons for needing greater fire protection in vehicles. Primarily, however, is the need for greater occupant safety. Vehicles which catch fire are often quickly consumed by the fire and there is little time to remove occupants from the vehicle. This is particularly concerning in crash situations where a driver or passenger may be injured or unconscious, requiring outside help and additional time to safely remove the persons from the vehicle. As such, greater fire protection in vehicles may help reduce fire related injuries and fatalities as well as help reduce the damage to the vehicle.

There is thus a need for improve protection for vehicles and vehicular compartments from fire and extreme heat.

SUMMARY OF THE INVENTION

It is an object of the present invention to provide improved protection from fire and extreme heat for vehicles.

According to one aspect of the invention, a ceramic fiber based material such as ceramic paper may be used for a fire barrier in vehicles. The ceramic paper is advantageous as it may be formed in the desired weight and thickness and formed into the shapes necessary for enclosing a vehicle compartment. The ceramic paper is particularly suited for use as a fire barrier because it will withstand temperatures of 1400° C. or greater without sustaining damage. Additionally, the ceramic paper provides some protection against heat as it has some insulating properties. The ceramic paper is also advantageous as it does not degrade at elevated temperatures and does not release hazardous chemicals as synthetic plastic insulation and interior components may do when exposed to high heat. According to the desired application, the ceramic paper may include additional layers such as reinforcement layers to strengthen the ceramic, water proofing layers, and the like.

These and other aspects of the present invention are realized in a ceramic insulation for vehicles as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
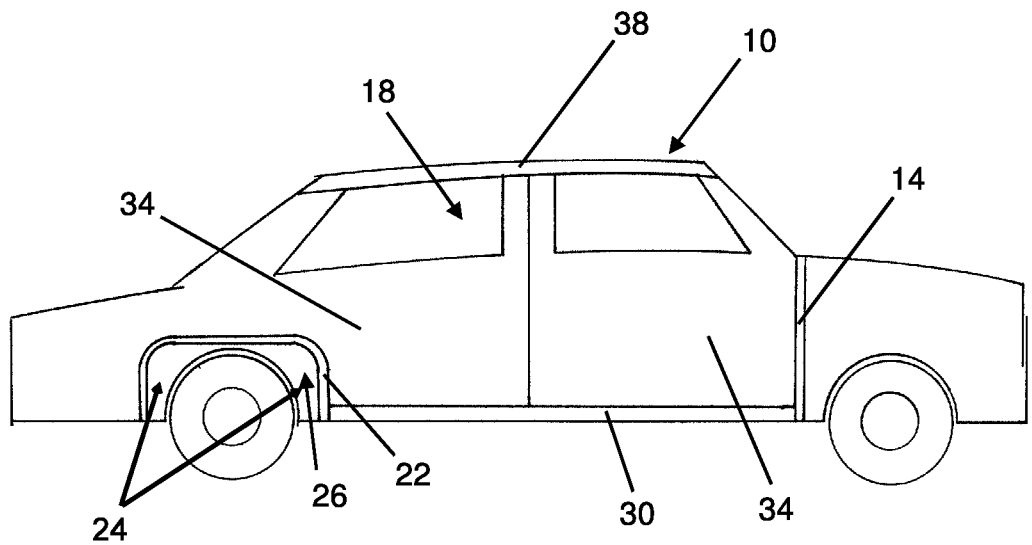
FIG. 1 shows a side view of a vehicle having a fire barrier according to the present invention.

Turning now to FIG. 1, a side view of an automobile is shown. Although a car is shown, the principles discussed may apply to various types of automobiles such as trucks, busses, etc. Additionally, the principles and structures discussed herein are applicable to vehicles generally, including boats and aircraft, for example. In many cases, passenger boats such as ski boats have insufficient fire protection for the occupants and could benefit from increased fire protection around the engine and fuel tanks. Aircraft such as helicopters and airplanes also benefit from additional fire protection around areas such as the fuel tanks, engine, wiring, and passengers.

Typically, automobiles 10 include a limited quantity of a low grade insulation, such as a spun polyester felt placed across the firewall and floor and a foam headliner placed inside the roof. This insulation is capable of reducing the noise in the passenger compartment and providing a small amount of thermal insulation, reducing the heat transfer from the engine and the outside weather.

The present invention provides a barrier against fire and extreme temperature. The fire and temperature barrier is referred to as a fire barrier herein for simplicity. A fire barrier 14 may be placed around the engine compartment of the vehicle 10. The fire barrier would provide protection to the passenger compartment 18 from engine fires, battery fires, and the like. The fire barrier may be made from a heavy ceramic paper as is described in U.S. Pat. No. 6,533,897 which is incorporated herein by reference in its entirety. A ceramic paper may be formed into the shape desired to fit the firewall or other areas of the car as is desired. Although different thicknesses may be used as necessary, ceramic paper having a thickness of about 1 mm or greater, formed with appropriate processes and additives, would retain the mechanical strength necessary for such an application. The fire wall barrier 14 provides additional safety to the occupants against fires originating from the engine compartment, as may occur in a crash.

A fire barrier 22 may be placed around the fuel tank. Fuel tanks pose a risk of fire or explosion in crashes or other situations. The explosion from a fuel tank easily enters the passenger compartment and trunk without protection around the fuel tank. It is desirable that the fuel tank barrier 22 is not completely sealed around the fuel tank, but rather that the barrier provides a channeled escape 24 for the flames and pressure generated in a fire. Thus, the barrier 22 may have a channel 24 or an opening 26 towards the ground as is shown.

The automobile 10 may also include fire barriers in the floor 30, doors 34, and roof 38 as is desired to provide additional protection to the occupants. The fire barriers described will largely prevent the passage of fire and extreme heat into the passenger compartments, slowing or preventing the spread of a fire and providing additional protection to the occupants.

In many situations, such as in common passenger vehicles, fire barriers may only be necessary around more critical areas such as the engine compartment and the fuel tank. In other vehicles such as limousines and automobiles used to transport high profile persons such as celebrities or dignitaries, additional fire protection may be desired around the passenger compartment to provide additional protection and time to safely handle an emergency.

Figure 2:
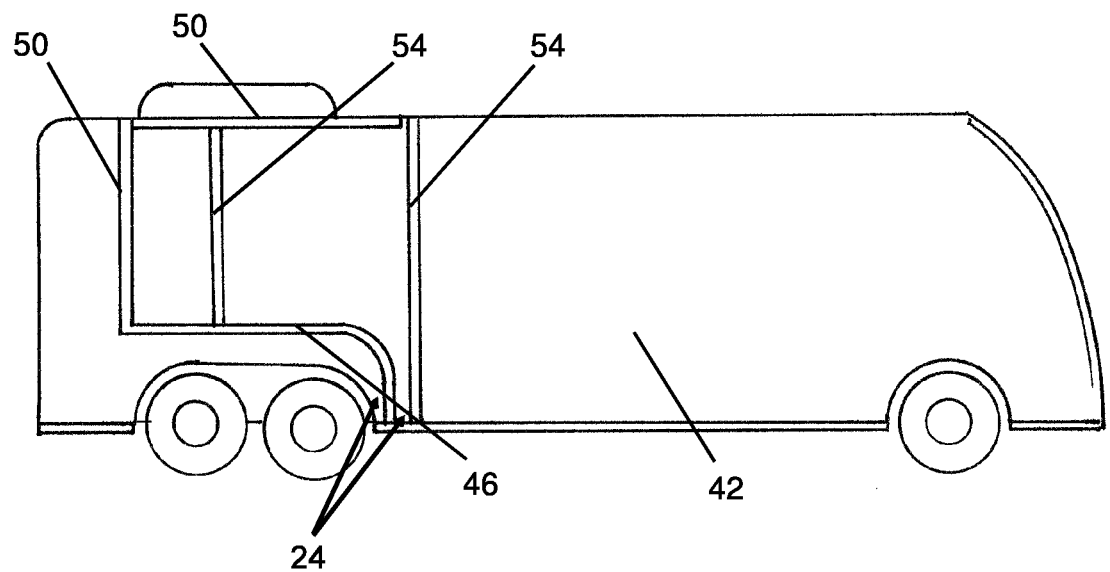
FIG. 2 shows a side view of a bus having a fire barrier according to the present invention.

Turning now to FIG. 2, a side view of a bus 42 is shown. The bus includes fire barriers according to the present invention. The bus 42 illustrates how the application of fire barriers may vary according to the different type of vehicle. The bus 42 includes a fire barrier 46 around the engine compartment (typically in the back of buses) as well as fire barriers 50 around the heating and air conditioning components of the bus. The fire barriers 46, 50 provide additional protection to the passengers in the case of fire or malfunction of the engine and climate control components.

Additionally, the bus 42 may include movable fire barrier dividers 54 which may be extended across portions of the passenger compartment of the bus to isolate areas of the passenger compartment. As shown, the fire barrier dividers 54 may be placed laterally across the rear portions of the passenger compartment to provide additional isolation and protection from the engine compartment. Similar fire barriers and fire barrier dividers may be used to provide protection from the fuel tank. Dividers 54 are made to be easily placed in a desired location after a need arises or when a need becomes likely. The dividers 54 may be formed as curtains or folding walls which are easily pulled closed to separate an area, or may be panels which are placed into a frame or receptacle. Thus, if the engine of the bus 42 were to catch fire, passengers or the bus driver may quickly move away from the rear portion of the passenger compartment and close the dividers 54 to provide additional protection to the passenger compartment and passengers. The dividers 54 thus extend the time available to properly evacuate the passenger and to counteract the engine fire, if possible.

Figure 3:
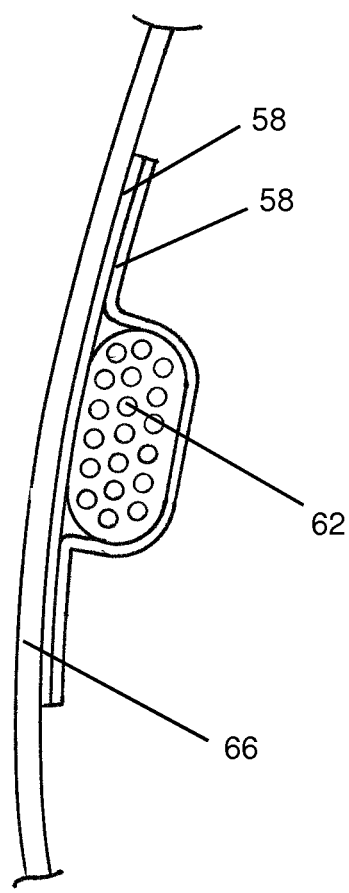
FIG. 3 shows an electrical component protected by a fire barrier according to the present invention.

FIG. 3 shows the fire barrier of the present invention used to protect vehicle wires and other electronic components from fire. In nearly all vehicles, wires and electronic components are used to control the operation of the vehicle. These components may pose a few challenges. A small fire which may be easily extinguished and otherwise relatively harmless to the structure of the vehicle may quickly damage wires and electronic components. Additionally, sparks from electrical components may cause a fire.

As shown, fire barriers 58 have been placed around vehicle wiring 62 (other electrical components may be similarly protected). The fire barriers 58 may be wrapped around free-standing wires or may be attached to the vehicle structure 66 as necessary. The fire barrier 58 will prevent a fire from starting if sparks are generated from the electrical components 62 in an area where fuel vapors or other flammable materials are present, reducing the risk of fire to the vehicle. The fire barrier 58 will also protect the electrical components 62 from a fire if a fire starts in the vehicle. This allows vehicle occupants additional time to extinguish the fire before the fire damages the vehicle electrical components and disables the vehicle. In aircraft, such as helicopters or airliners, the additional protection and time may permit the aircraft to operate normally until landing rather than experiencing a failure of part of the electrical system and a resulting crash. It will be appreciated that other sensitive vehicle components, such as fuel lines, may also be similarly protected with the fire barrier of the present invention.

Figure 4:
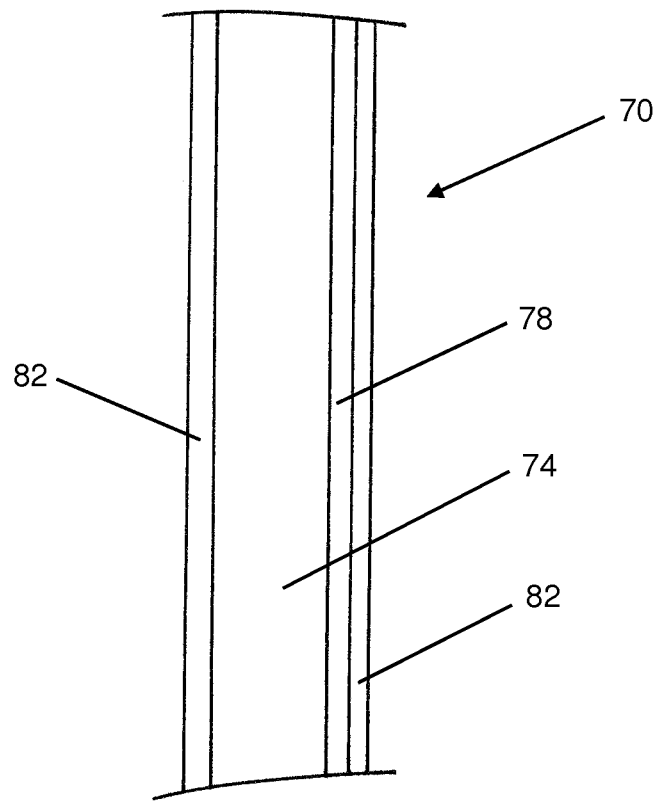
FIG. 4 shows a side view of a fire barrier of the present invention.

Turning now to FIG. 4, a side view of a fire barrier according to the present invention is shown. The fire barrier is illustrative of the structures of the fire barriers discussed in the preceding figures, and the structures shown are understood to apply to all of the embodiments discussed herein. The fire barrier 70 includes a layer of ceramic fiber based material 74 which is preferably a ceramic paper. The fire barrier often includes a reinforcement 78, such as a metal mesh or Kevlar mesh to increase the strength of the fire barrier. This is particularly desirable in application such as the curtains where the barrier may be moved and installed or uninstalled according to need rather than being permanently installed as a part of the vehicle.

The fire barrier 70 may also include a water proofing layer 82 on one or both sides of the ceramic fiber to improve the resistance of the barrier to rain and the like. This is particularly desirable in applications which are outside of the passenger compartment and more exposed to the elements, such as when installing the fire barrier 70 onto an automotive firewall or onto a boat. The various layers of the fire barrier 70 may be attached together in a variety of ways. Although glue can be used, mechanical fastening is often desirable as the glue may degrade when exposed to high heat. Thus, the layers may be held together by stitching or quilting, or simply by applying elevated heat and pressure to the fire barrier to join the layers. If desired, the fastening need not extend across the entire fire barrier but may be done around the edges and select middle portions, if desired.

The ceramic fiber barrier may be advantageously used as barriers against fire and extreme heat. As is discussed herein, ceramic fiber based materials are advantageous as barriers against fire and extreme heat for several reasons. The ceramic materials have good mechanical and dimensional stability. The various types of ceramic materials may be formed in appropriate thicknesses, densities, and hardness so as to be durable in the various applications. Reinforcement materials such as metal, fiberglass or Kevlar mesh may be added to the ceramic materials to further stiffen or reinforce the material.

The ceramic materials also provide exceptional resistance to temperature and do not readily degrade when exposed to temperatures as high as 1400° C. As such, they will typically protect other structures from burning even when exposed to high temperature or flame for extended periods of time. The ceramic materials also do not readily decompose. The ceramic fibers are stable when exposed to many environmental conditions including heat, light, moisture, etc., and do not decompose when exposed to continued flame. Additionally, the ceramic materials do not decompose or evolve significant amounts of hazardous chemicals when exposed to extreme heat as plastics and other insulating materials may do. Many other insulating materials will decompose when exposed to high heat, causing degradation of the material as well as the release of toxic chemicals which may harm vehicle occupants.

There is thus disclosed an improved fire barrier for vehicles. It will be appreciated that numerous changes may be made to the present invention without departing from the scope of the claims.

What is claimed is:

1. A fire barrier for vehicles comprising:
   a ceramic fiber based material extending so as to cover a surface, the ceramic fiber based material resisting combustion at elevated temperatures;
   wherein the ceramic fiber based material is attached to the vehicle;
   wherein the ceramic fiber based material encloses a passenger compartment of the vehicle; and
   wherein the ceramic fiber based material defines a channel which directs flames away from the passenger compartment of the vehicle and which directs flames away from the vehicle.

2. The fire barrier of claim 1, wherein the fire barrier is attached to an external surface of the passenger compartment to protect the passenger compartment from a source of fire which is external to the vehicle.

3. The fire barrier of claim 1, wherein the fire barrier is attached to a passenger compartment floor.

4. A fire barrier for vehicles comprising:
   a ceramic fiber based material extending so as to cover a surface, the ceramic fiber based material resisting combustion at elevated temperatures;
   wherein the ceramic fiber based material is attached to the vehicle; and
   wherein the ceramic fiber based material encloses a passenger compartment of the vehicle; and
   wherein the fire barrier comprises a removable divider positionable inside of the passenger compartment to isolate a portion of the passenger compartment.

5. The fire barrier of claim 4, wherein the removable divider is a removable curtain.

6. The fire barrier of claim 4, wherein the ceramic fiber based material is a ceramic paper having a density between 11.5 and 15.4 pounds per cubic foot.

7. A vehicle fire barrier comprising:
   a ceramic fiber based material which resists combustion at elevated temperatures;
   wherein the ceramic fiber based material is attached to a vehicle to cover a portion of the vehicle; and
   wherein the ceramic fiber based material defines a channel which directs flames away from said portion of the vehicle and directs flames away from the vehicle.

8. The fire barrier of claim 7, wherein the ceramic fiber based material comprises a ceramic paper.

9. The fire barrier of claim 8, wherein said channel directs flames towards the ground.

10. The fire barrier of claim 8, wherein the ceramic paper has a density between about 11.5 and about 15.5 pounds per cubic foot.

11. The fire barrier of claim 7, wherein the ceramic fiber material is disposed in a passenger compartment of a vehicle to isolate a portion of the passenger compartment.

12. The fire barrier of claim 11, wherein the ceramic fiber material is disposed on an exterior portion of the passenger compartment to isolate the passenger compartment from a fire which is outside of the vehicle.

13. A fire barrier for insulating a vehicle comprising:
    a ceramic fiber based material which resists combustion at elevated temperatures;
    wherein the ceramic fiber based material is attached to a vehicle so as to define a fire barrier;
    wherein the ceramic fiber based material is disposed inside of the passenger compartment of the vehicle; and
    wherein the ceramic fiber based material forms a removable divider which is selectively disposable inside of the passenger compartment to isolate a portion of the passenger compartment.

14. The fire barrier of claim 13, wherein the ceramic fiber based material is disposed on a portion of the passenger compartment which forms an exterior wall of the vehicle to protect from fire originating from outside of the vehicle.

15. The fire barrier of claim 14, wherein the ceramic fiber based material is disposed on the floor of the vehicle.

16. The fire barrier of claim 13, wherein the ceramic fiber based material encloses the passenger compartment of the vehicle.

17. A vehicle fire barrier comprising:
    a ceramic fiber based material which resists combustion at elevated temperatures;
    wherein the ceramic fiber based material is attached to the vehicle to cover a portion of the vehicle; and
    wherein the ceramic fiber material encloses a portion of the vehicle and wherein the ceramic fiber material defines a channel which directs flames from said portion of the vehicle away from the vehicle.

18. The fire barrier of claim 17, wherein said channel directs flames towards the ground.

19. The fire barrier of claim 17, wherein the ceramic fiber based material comprises a ceramic paper.

* * * * *